United States Patent [19]

Göbl-Wunsch et al.

[11] 4,264,148
[45] Apr. 28, 1981

[54] LIQUID CRYSTAL DISPLAY DEVICES HAVING AN INDUCED CHOLESTERIC PHASE

[75] Inventors: Annerose Göbl-Wunsch; Gerd Heppke; Feodor Oestreicher, all of Berlin, Fed. Rep. of Germany

[73] Assignee: Siemens Aktiengesellschaft, Berlin & Munich, Fed. Rep. of Germany

[21] Appl. No.: 48,795

[22] Filed: Jun. 15, 1979

[30] Foreign Application Priority Data

Jun. 22, 1978 [DE] Fed. Rep. of Germany ....... 2827471

[51] Int. Cl.³ .......................... G02F 1/13; C09K 3/34
[52] U.S. Cl. ................................. 350/346; 350/350 R; 350/350 S; 350/351; 252/299
[58] Field of Search ................ 350/346, 350 R, 350 S, 350/351; 252/299

[56] References Cited

U.S. PATENT DOCUMENTS

| | | | |
|---|---|---|---|
| 3,652,148 | 3/1972 | Wysocki et al. | 350/346 |
| 3,679,290 | 7/1972 | Adams et al. | 252/299 |
| 3,711,181 | 6/1973 | Adams, Jr. et al. | 252/299 |
| 3,931,041 | 1/1976 | Saeva et al. | 252/299 |
| 3,947,375 | 3/1976 | Gray et al. | 252/299 |
| 3,973,830 | 8/1976 | Tsukamoto et al. | 252/299 |
| 3,977,769 | 8/1976 | Tsukamoto et al. | 252/299 |
| 4,016,094 | 4/1977 | Tsukamoto et al. | 252/299 |
| 4,017,156 | 4/1977 | Moriyama et al. | 350/347 |
| 4,077,260 | 3/1978 | Gray et al. | 252/299 |
| 4,108,793 | 8/1978 | Castellano et al. | 252/299 |
| 4,143,947 | 3/1979 | Aftergut et al. | 252/299 |
| 4,195,916 | 4/1980 | Coates et al. | 252/299 |

FOREIGN PATENT DOCUMENTS

2847601 5/1979 Fed. Rep. of Germany ........... 252/299

OTHER PUBLICATIONS

Gray, C. W., et al., Mol. Cryst. Liq. Cryst., vol. 37, pp. 189–211 (1976).
Klanderman, D., et al., J.A.C.S., vol. 97, No. 6, pp. 1585–1586 (1975).
Wysocki, J., et al., "Liquid Crystals and Ordered Fluids," Plenum Press, N.Y., pp. 419–444 (1970).
Adams, J., et al., Mol. Cryst. Liq. Cryst., vol. 15, pp. 27–35 (1971).
Stegemeyer, H., et al., Naturwissenschaften, vol. 62, pp. 436–437 (1975).
Hanson, H., et al., Mol. Cryst. Liq. Cryst., vol. 42, pp. 15–32 (1977).

*Primary Examiner*—Teddy S. Gron
*Attorney, Agent, or Firm*—Hill, Van Santen, Steadman, Chiara & Simpson

[57] ABSTRACT

An operable liquid crystal display device having threshold energy fields dependent on a finite temperature operating range is provided with a layer of a liquid crystal material positioned between the carrier plates of such device. The liquid crystal material includes a nematic carrier material and at least two doping chiral additives, one of which exhibits a clockwise twisting tendency and the other which exhibits a couter-clockwise twisting tendency. The twisting characteristic for the cholesteric phase has a temperature-dependent pitch and, under certain conditions, a temperature-dependent direction of rotation. With such a multiply-doped liquid crystal material and with the application of a controllable select energy field, such as electricity or magnetism to such material, selective display characteristic data can be generated by, for example, a temperature-independent pitch, a helix inversion, or a pitch which greatly increases or decreases with an increasing temperature within the finite temperature range. In such liquid crystal materials, the threshold field strengths are temperature-constant for different display effects or may be compensated to the temperature-dependency of other magnitudes, such as the temperature drift of a driving module designed as an integrated circuit.

14 Claims, 4 Drawing Figures

LIQUID CRYSTAL DISPLAY DEVICES HAVING AN INDUCED CHOLESTERIC PHASE

BACKGROUND OF THE INVENTION

1. Field of the Invention

The invention relates to liquid crystal display devices and somewhat more particularly to liquid crystal display devices having a layer of a liquid crystal material enclosed between two carrier plates wherein said liquid crystal material includes a nematic carrier substance and at least one chiral additive which induces a cholesteric phase characterized by a twisting in such layer and a method of operating such display device.

2. Prior Art

Liquid crystal display devices having threshold voltages dependent on a finite temperature operating range and having a layer of a liquid crystal material positioned between the carrier plates of such device wherein the liquid crystal material includes a nematic carrier and at least one chiral additive or dopant which induces a cholesteric phase characterized by twisting in the liquid crystal layer are known in a multitude of embodiments; cf. in this regard, for example, DT-OS No. 2,727,562.

When one dopes a nematic liquid crystal material with a chiral compound, the nematic material experiences a characteristic twisting. In such an admixture, the pitch and the direction of rotation of this helix (twisting) depend not only on the effective twisting or rotary power of the dopant and the concentration thereof, but also depend on the temperature experienced by the admixture. Since such helix parameters (i.e., pitch and direction of rotation) in turn influence important characteristic data of the induced cholesteric phase, such as for example, the threshold field strengths required for phase transitions, the necessary switching voltages, for example, also change with the operating temperature.

Such threshold voltage behavior does not have a disruptive effect on the display device, if one drives the device, as a precaution, with a sufficiently high voltage. Such a precaution however increases the power dissipation and and is useful only to a very limited degree, especially in multiplexable display devices because the danger of so-called cross-talk increases with increased switching voltages.

Heretofore suggestions have been made to reset or relate switching voltages to operating temperatures. Control loops suitable for such purposes not only generally demand a significant circuit outlay but can only actually be relatively simply realized when the threshold field strengths have a relatively constant temperature drift. However, such a temperature function has not yet been attained in practically significant liquid crystals with induced cholesteric phases. (Although a threshold voltage which is linearly dependent on temperature has been reported by J. J. Wysocki et al in *Liquid Crystals and Ordered Fluids,* 1970, pages 419–444, Plenum Press, New York, London, wherein an investigation was based on a binary mixture consisting exclusively of cholesteric components).

SUMMARY OF THE INVENTION

The invention provides a means of twisting, in a liquid crystal layer with induced cholesteric orientation, which exhibits a select temperature dependency. This temperature function is available for relatively large temperature ranges and can be varied within relatively wide limits. The resultant temperature curve is adjustable, which leads to a desired temperature dependency of other liquid crystal parameters.

In accordance with the principles of the invention, an operative liquid crystal display device having threshold field strengths dependent upon a finite temperature range is provided, along with a method of operating such device. In such a device the liquid crystal material includes a nematic carrier substance and at least one chiral additive which induces a cholesteric phase characterized by a twisting tendency in the liquid crystal layer and contains at least two chiral additives, one of which exhibits a clockwise twisting tendency and the other of which exhibits a counter-clockwise twisting tendency and such additives strive, within a finite temperature range, to generate a clockwise or a counter-clockwise twisting in the nematic carrier substance.

In certain embodiments of the invention, the two chiral additives or dopants are so-selected that the twisting of the induced cholesteric phase has at least an approximately temperature-independent pitch within the finite temperature range. In other embodiments of the invention, the two chiral additives are so-selected that the twisting of the induced cholesteric phase changes its direction of rotation upon passing through a specific temperature and at this specific temperature exhibits a substantially infinitely greater pitch. In other embodiments of the invention, the two chiral additives are so-selected that the twisting of the induced cholesteric phase has a pitch which either increases or decreases more strongly with an increasing temperature within the finite temperature range than in the presence of only one such chiral additive. In yet other embodiments of the invention, the two chiral additives are so-selected that the switch-on threshold field strengths and the switch-off threshold field strengths are at least approximately linearly dependent on a temperature within the finite temperature range or are at least approximately temperature-independent in the finite temperature range.

In certain method embodiments of the invention, a liquid crystal display device having at least two chiral additives within the layer of liquid crystal material therein as described above, is switched between an induced cholesteric phase and a nematic phase. In certain forms of such embodiments, the liquid crystal layer is located between two linear polarizers and the induced cholesteric phase has a twisting about an axis which is substantially perpendicular to the plane of the carrier plates and the twisting has a pitch defined by the relation:

$$p = d/(\tfrac{1}{4} + n/2)$$

wherein p is the pitch; d is the thickness of the liquid crystal layer and n is a natural number, and the nematic phase has a plate-perpendicular preferential direction. In other method embodiments of the invention, the liquid crystal display device having at least two chiral additives within a liquid crystal layer therein as described above, is switched between an induced cholesteric phase and a dynamic scattering phase. In yet other method embodiments of the invention, the induced cholesteric phase within the liquid crystal layer is elastically deformed. In other method embodiments of the invention, the liquid crystal layer is switched between the induced cholesteric phase and another phase which is retained at least upon a select reduction (i.e., decrease or removal) of the applied switching energy.

Further principles of the invention, together with further objects, advantages and embodiments will be best understood from the following detailed description when read in conjunction with the accompanying drawings.

DESCRIPTION OF THE PREFERRED EMBODIMENT

Figure 1:
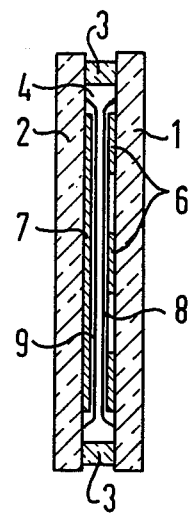
FIG. 1 is an elevated cross-sectional side view of an exemplary liquid crystal display device operable with a phase transition effect in accordance with the principles of the invention.

The invention provides an operative liquid crystal display device and a method of operating the same which includes a means of twisting in the liquid crystal layer with induced cholesteric orientation which exhibits a select temperature dependency.

In order to more fully explain the effect of the addition of multiple dopants in accordance with the principles of the invention to liquid crystal materials in affecting the temperature behavior of the induced cholesteric phase, the following derivations are set forth.

In a first approximation, the reciprocal of the helix pitch is proportional to the weight percentage of an optically active additive in a liquid crystal system. Further, the effect of a plurality of chiral doping additives or substances is cumulative. Accordingly the relation:

$$\frac{1}{p} = \sum_{i=1}^{n} h_i c_i \tag{1}$$

is valid wherein:

p is the pitch thereof;

$h_i$ is the helical twisting strength or effective rotary power of the ith additive; and $c_i$ is the weight percent concentration of the ith additive.

Formula (1) generally loses its validity for c>20 wt.%, when the additive is cholesteric-like, i.e., belongs to the cholesterol derivatives. However, for nematic-like chiral additives, which are presently preferred as doping agents, the approximate formula (1) is generally valid over the entire concentration range.

If now one develops the temperature-dependent value, $h_i$, in a power series by a clearing temperature ($t_c$) or by an average or mean working temperature, then one attains the relation:

$$h_i = \sum_{j=1}^{\infty} \alpha_i^j \cdot \tau^{j-1} \cdot c_i \tag{2}$$

wherein:

$\alpha_i^j$ is a constant and $\tau$ is the actual temperature minus clearing temperature or actual temperature minus mean working temperature.

Accordingly, equation (1) can be rewritten as:

$$\frac{1}{p} = \sum_{i=1}^{n} \sum_{j=1}^{\infty} \alpha_i^j \cdot \tau^{j-1} \cdot c_i \tag{3}$$

which upon rearrangement, becomes:

$$\frac{1}{p} = \sum_{j=1}^{\infty} \left( \sum_{i=1}^{n} \alpha_i^j \cdot c_i \right) \tau^{j-1} \tag{4}$$

Given the generally admissible assumption that the reciprocal of the pitch induced by each individual doping substance decreases linearly with increasing temperatures, equation (4) can be simplified to become:

$$\frac{1}{p} = \sum_{i=1}^{n} (\alpha_i^1 c_i + \alpha_i^2 c_i \tau) \tag{5}$$

with $\alpha_i^1$ having a different operating sign than $\alpha_1^2$.

Applying equation (5) to an example of two different chiral doping materials, one obtains:

$$p = \frac{1}{\alpha_1^1 c_1 + \alpha_2^1 c_2 + (\alpha_1^2 c_1 + \alpha_2^2 c_2) \tau} \tag{6}$$

Equation (6) shows that, given a doping of a liquid crystal material with two chiral additives having a twisting tendency in the same direction, the helix pitch assumes a temperature curve which lies between that which the pitch would assume if only one of the two doping chiral additives were utilized. Accordingly, with such systems, great changes are not possible. However, it is a different matter when an additive having a twisting tendency clockwise and an additive having a twisting tendency counter-clockwise are dissolved in a nematic carrier. In such a system, the power series coefficients have the following operational signs:

$$\alpha_1^1 > 0, \alpha_1^2 < 0 \tag{7}$$

$$\alpha_2^1 < 0, \alpha_2^2 > 0$$

(In a right-hand coordinate system, a doping material, i.e., a chiral additive, having a tendency to twist clockwise has a positive $\alpha_i^1$ and correspondingly, a doping material having a tendency to twist counter-clockwise has a negative $\alpha_i^2$).

Thus, for example, one obtains a temperature-independent pitch when the relation $|\alpha_1^2 c_1| = |\alpha_2^2 c_2|$ is valid. If one selects the concentration of additives such that $|\alpha_1^1 c_1| = |\alpha_2^1 c_2|$ is valid, then, given $\tau=0$, a helix inversion occurs. Likewise, as can be easily seen, one can adjust the concentration of the two additives so as to allow the pitch to increase more strongly or to decrease more strongly with an increasing temperature than in the case of doping with only one chiral compound.

A temperature-constant pitch leads to a similar temperature-constant threshold voltage when both magnitudes are linearly interrelated. This relationship is generally true for the field strength at which a cholesteric phase changes into a nematic phase. On the other hand, if this relationship is not strictly linear, then, given certain conditions, one can attain a constant threshold field strength by means of a correspondingly corrected temperature function of the pitch.

Equation (1) has been known as such for years; cf., for example, James E. Adams et al, *Molecular Crystals and Liquid Crystals*, Vol. 15, pages 27–35 (1971). An indication that the effective rotary power of a molecule is, in general, temperature-dependent is provided by this early prior art publication. One of the first attempts to deal with this temperature function mathematically was undertaken by H. Stegemeyer et al, *Naturwissenschaften* (Natural Science) Vol. 62, pages 436–437 (1975). The authors of this article attribute the observed temperature curve to the temperature influence on the ordering parameters for molecular rotation, however, the equations derived from their study do not supply results which are quantitatively satisfying. In a relatively recent article, H. Hansen et al, *Molecular Crystals and Liquid Crystals*, Vol. 42, pages 15–32 (1977) generally summarize the current state of the art in the area under consideration and first determine that cholesteric textures which are induced behave differently than phases which are naturally cholesteric and secondly derive analytical expressions which rather precisely reproduce the temperature curve of an induced twisting but offer no adequate physical explanation of these functions. The above-cited references show that the phenomenon of forced cholesteric orientation in host substances has been of rather active scientific interest for some time, however, up to the present, workers in the art have not employed the observed interrelationships to purposely influence the temperature dependency of the induced twisting. Somewhat more particularly, there is a total lack in the prior art of any indication for achieving a defined temperature curve by means of a multiple doping with chiral additives which rotate differently from one another.

The multiple doping with differently rotating chiral additives to a host nematic carrier in accordance with the principles of the invention produces substantial advantages in a number of display principles. For example, one can provide the switch-on and/or switch-off threshold voltages with a relatively simple temperature curve in some phase transition effects such as: reversible phase transition; phase transition with hysteresis (the so-called "bistability effect"); phase transition with storage capability; cf. in this regard G. H. Heilmeier et al, *Proceedings of The IEEE*, Vol. 57, pages 34–38 (1969) or Von K. H. Walter et al *Berichte der Bunsen-Gesellschaft*, [(Reports of the Bunsen Society), Vol. 9, pages 912–914 (1974)].

In displays based on the so-called "twisting nematic" effect, a temperature-constant pitch can be adjusted without further ado. A temperature-constant threshold voltage is also realizable; namely, the shorter the pitch in the idle state of the liquid crystal cell, the more simply it is realized.

Temperature-independent threshold voltages are also attainable in displays of the dynamical scattering type or in cells which function with field generated deformations. In addition, temperature-stabilized bubble-domain displays or displays utilizing wavelength selective reflections based on the twisted molecular structure are also attainable.

Referring now to FIG. 1, a more or less exemplary liquid crystal display device is illustrated as comprised of a front carrier plate 1, a back carrier plate 2 spaced from plate 1 via a means 3, such as a hermetically-sealed frame, which connects the plates to one another to define a space or chamber therebetween. A layer 4 of a liquid crystal material is positioned within the chamber between the carrier plates 1 and 2. Each of the plates are provided with a means for selectively applying an energy field to select areas of the structure in order to generate the desired displays, for example each plate can be provided with a conductive coating (a segmented front electrode with electrode segments 6 and a continuous back electrode 7) on their interior surfaces, facing one another; as well as with layers 8 and 9 for orientating the liquid crystal molecules. In the present embodiment, the display device functions via a phase transition effect; upon the controlled application of a sufficiently high voltage from a suitable source (not shown), the cholesteric texture induced in the idle state is transformed into a homeotropic nematic orientation; upon reduction of the applied voltage, this phase is first retained until it returns into the twisted initial state when a second threshold value is fallen below.

In the exemplary embodiment illustrated at FIG. 1, the liquid crystal layer 4 is composed of an admixture consisting essentially of a nematic carrier, such as commercially available under the trade designation "S 1132" from Merck & Co. Inc., and two differently twisting chiral compounds, such as commercially available under the trade designation "CB 15" and "ZLI 811" from Merck & Co. Inc. The nematic material S 1132 comprises a mixture of three different phenylcyclohexanes and a biphenylcyclohexane. The chemical structure of the two additives are set forth in Table II below. The weight percentages of the doping materials CB 15 and ZLI 811 are, respectively 12.75 and 10.63 wt. %.

Figure 2:
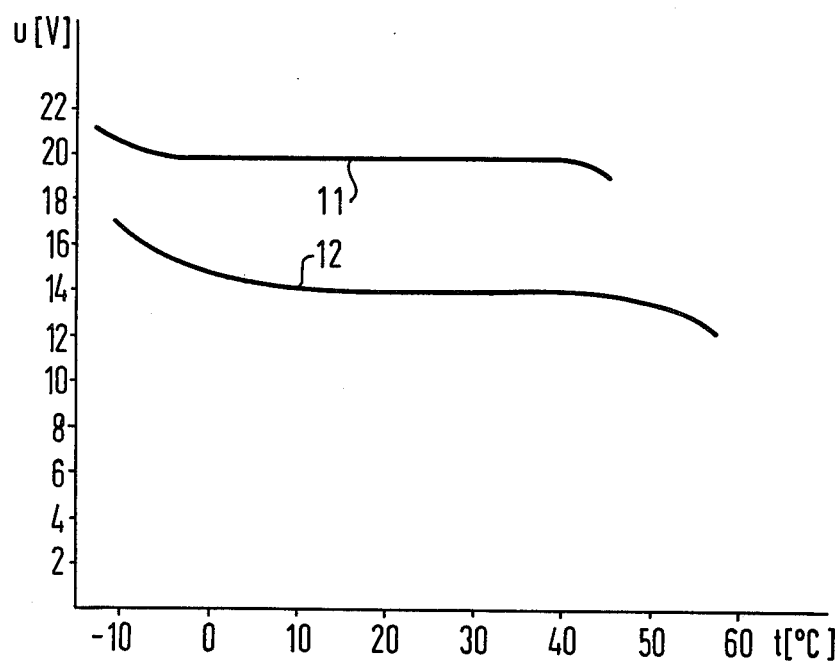
FIG. 2 is a graphical illustration showing the switch-on threshold voltages for two different liquid crystal mixtures having positive dielectric constant anisotropy and useful in the device of FIG. 1.

One can derive from the graphical illustration at FIG. 2 that the switching-on threshold voltage (curve 11) is substantially completely independent of temperature in a finite temperature range extending from about −3° through +40° C. By comparison, if one adds 6.83 wt. % of CB 15 and 6.33 wt. % of ZLI 811 to the nematic material "E8", commercially available from Merck & Co. Inc., then the switch-on threshold voltage assumes a lower and a somewhat less constant value between about +10° and +45° C. (curve 12).

Figure 3:
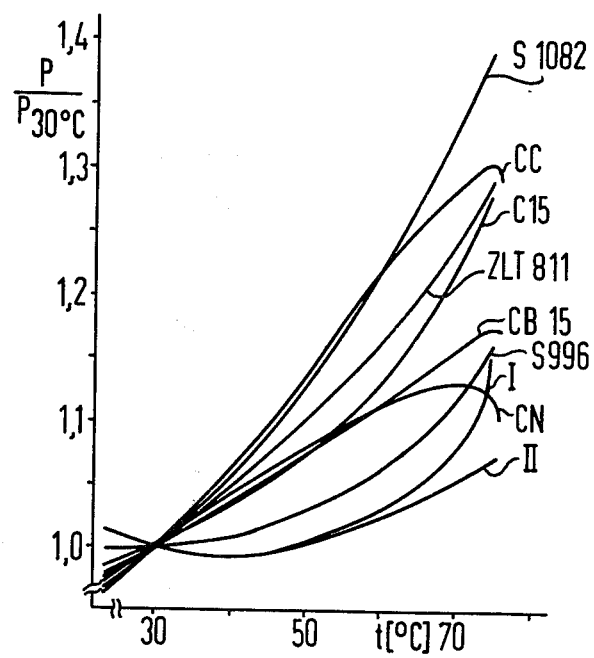
FIG. 3 is a graphical illustration showing the pitch for a number of binary liquid crystal mixtures having negative dielectric constant anisotropy standardized as to value at 30° C.

In the graphical illustration at FIG. 3, the pitch is standardized to 30° C. and is indicated as a function of temperature for various chiral doping materials (further identified in Table II below), which are each dissolved in the same nematic carrier material (commercially available under the trade designation "nematic phase 4" from Merck &. Co. Inc.) and which comprises a eutectic mixture of two azoxy compounds having, respectively, the structural formulas:

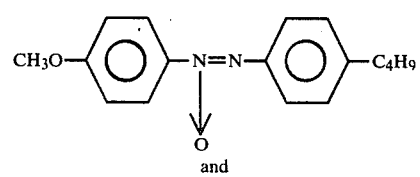

and

-continued

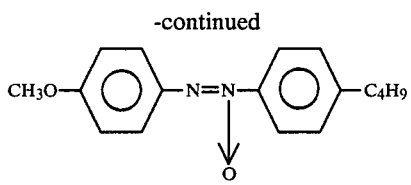

The power series coefficients determined from this study are summarized below in Table I. Table II identifies the chemical structural formulas of the chiral compounds utilized and sets forth the respectively selected weight percentage.

TABLE I

| Additive | $a_i^1 \cdot 10^3$ [($\mu$m · Wt. %)$^{-1}$] | $a_i^2 \cdot 10^5$ [($\mu$m · Wt. % K)$^{-1}$] | $a_i^3 \cdot 10^7$ [($\mu$m · Wt. % K$^2$)$^{-1}$] | $t_c$ [°C.] |
|---|---|---|---|---|
| I | −6.78 | 5.36 | 7.47 | 75.0 |
| II | −15.4 | 6.94 | 8.65 | 77.3 |
| S996 | −8.53 | 6.16 | 6.77 | 75.7 |
| ZLI 811 | −103.0 | 75.8 | 22.5 | 75.3 |
| S 1082 | 19.7 | −21.1 | −7.85 | 75.4 |
| CB 15 | 55.3 | −22.3 | 0.04 | 75.4 |
| C 15 | −9.94 | 9.88 | 8.17 | 74.9 |
| CN | −76.2 | 11.7 | −28.5 | 75.9 |
| CC | −44.1 | 25.3 | −13.6 | 76.0 |

TABLE II

| Additive | Structure | c Weight % |
|---|---|---|
| I | C₂H₅–CH(CH₃)–CH₂–O–⟨◯⟩–CH=N–⟨◯⟩–CN | 2.08 |
| II | C₂H₅–CH(CH₃)–CH₂–O–⟨◯⟩–CH=N–⟨◯⟩(Cl)–N=CH–⟨◯⟩–O–CH₂–CH(CH₃)–C₂H₅ | 1.68 |
| S 996 | C₂H₅–CH(CH₃)–CH₂–O–⟨◯⟩–C(=O)–S–⟨◯⟩–CN | 1.57 |
| ZLI 811 | CH₃–CH(C₆H₁₃)–O–C(=O)–⟨◯⟩–O–C(=O)–⟨◯⟩–O–C₆H₁₃ | 0.46 |
| S 1082 | CH₃–CH(C₂H₅)–CH₂–O–C(=O)–⟨◯⟩–O–C(=O)–⟨◯⟩–O–C₆H₁₃ | 1.22 |
| CB 15 | CH₃–CH(C₂H₅)–CH₂–⟨◯⟩–⟨◯⟩–CN | 0.73 |
| C 15 | CH₃–CH(C₂H₅)–CH₂–O–⟨◯⟩–⟨◯⟩–CN | 1.78 |
| CN | Cholesterylnonanoate | 0.30 |
| CC | Cholesterylchloride | 0.39 |

The curves as well as the data in Table I and II provide points of reference as to which doping material is particularly favorable for an individual application. In this regard, it must be pointed out that the twisting power of an individual doping material also depends on the character of the carrier material. In general, doping materials exhibiting the strongest "helical twisting power" are preferred because smaller concentration of such materials are effective and, consequently the resultant twisting is best described by the approximation equation (1).

Figure 4:
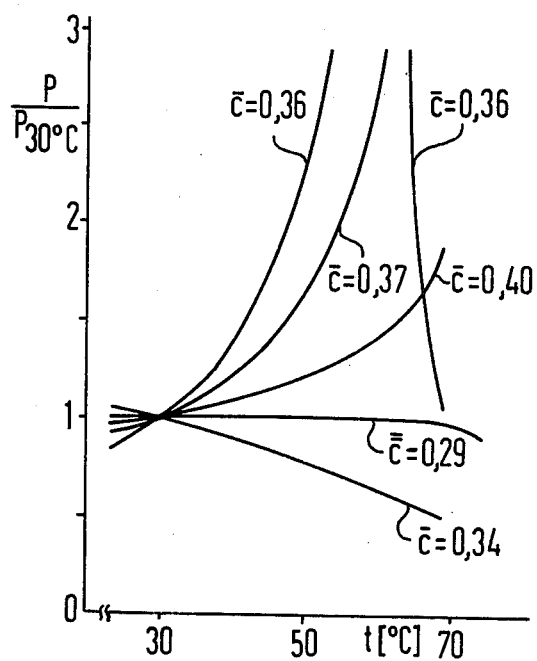
FIG. 4 is a graphical illustration showing the same function as in FIG. 3 for a liquid crystal mixture having a negative dielectric constant anisotropy and comprised of a nematic carrier and two differently twisting chiral additives, with the relative weight parts of the two additives as a parameter and useful in liquid crystal display devices in accordance with the principles of the invention.

The graphical illustration of FIG. 4 shows the pitch, likewise standardized to its respective value at 30° C., for a mixture consisting of "nematic phase 4" and the chiral additives CB 15 and ZLI 811. The concentration ratio, c, of the two chiral additives was varied as shown on the respective curves.

$$\bar{c} = c_{ZLI\,811}/(c_{ZLI\,811} + c_{CB\,15})$$

One can readily see from the illustrated curve that even small changes in the mixing ratio having very profound effects on the temperature behavior of the pitch. Given:

$$\bar{c} = 0.24 (c_{ZLI\,811} = 0.379 \text{ wt. \% and } c_{CB\,15} = 0.908 \text{ wt. \%})$$

the pitch, in the present illustration amounting to 68 $\mu$m, is up to ±3% constant in a finite temperature range extending from about −10° ı. to about +60° C. When one increases the ZLI 811 portion to c=0.34, then the pitch decrease, with an increasing temperature within the finite temperature range. A further increase (c=0.36) causes a helix inversion, characterized by a pole location with extremely steep edges; while another small increase (c=0.37) causes a relatively infinitely great pitch with an increasing temperature within the finite temperature range.

The invention is, of course, not limited to the illustrated exemplary liquid crystal materials mixtures. Thus, in an individual case, one can form a desired temperature function from not only two doping chiral materials but from a plurality of chiral additives, some of which exhibit a tendency to twist clockwise and some of which exhibit a tendency to twist counter-clockwise. Further, the energy for switching a liquid crystal display device can take other forms than electricity, for example magnetic field are useful in this regard. In general, the invention always offers advantages when one can give the characteristic data of a liquid crystal display, which depends on an operating temperature, a suitable temperature curve by influencing the temperature function of the helix parameters. For example, the temperature drift of a driving module, such as comprised of an integrated circuit, can be intercepted or compensated by a suitable multicomponent doping of a given liquid crystal carrier material in accordance with the principles of the invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim:

1. In an operable liquid crystal display device having threshold field strengths dependent on a finite temperature operating range and having a pair of carrier plates spaced from one another to define a space therebetween, means hermetically sealing said plates to one another so as to form a chamber, a layer of a liquid crystal material positioned within said chamber, said liquid crystal material including a nematic carrier host material and at least one chiral doping material which induces a cholesteric phase in said liquid crystal layer by twisting in such layer, the improvement comprising:
wherein said at least one chiral doping material comprises at least two chiral additive doping materials, one of which exhibits a clockwise twisting tendency and the other of which exhibits a counter-clockwise twisting tendency, said at least two chiral doping additives striving within a finite temperature range to generate a clockwise or a counter-clockwise twisting in said nematic carrier substance.

2. In a liquid crystal display device as defined in claim 1, wherein said at least two chiral additive materials are so-selected that the twisting of the induced cholesteric phase has an at least approximately temperature-independent pitch within the finite temperature range.

3. In a liquid crystal display device as defined in claim 1, wherein said at least two chiral additives are so-selected that the twisting of the induced cholesteric phase changes its direction of rotation upon passing through a specific temperature and at such specific temperature exhibits a substantially infinitely great pitch.

4. In a liquid crystal display device as defined in claim 1, wherein said at least two chiral additives are so-selected that the twisting of the induced cholesteric phase has a pitch which increases more strongly with an increasing temperature within the finite temperature range than in the presence of only one of such chiral additives.

5. In a liquid crystal display device as defined in claim 1, wherein said at least two chiral additives are so-selected that the twisting of the induced cholesteric phase has a pitch which decreases more strongly with an increasing temperature within the finite temperature range than in the presence of only one of such chiral additives.

6. In a liquid crystal display device as defined in claim 1, wherein said layer of liquid crystal material is electrically switchable between various optical states, and said at least two chiral additives are so-selected that a switch-on threshold voltage and a switch-off threshold voltage for said layer are at least approximately temperature-independent within the finite temperature range.

7. In a liquid crystal display device as defined in claim 1, wherein said layer of liquid crystal material is electrically switchable between various optical states, and said at least two chiral additives are so-selected that a switch-on threshold voltage and a switch-off threshold voltage for said layers are at least approximately linearly dependent upon a temperature within the finite temperature range.

8. In a liquid crystal display device as defined in claim 1, wherein said layer of liquid crystal material is magnetically switchable between various optical states, and said at least two chiral additives are so-selected that a switch-on threshold magnetic field and a switch-off threshold magnetic field for said layer are at least approximately temperature-independent within the finite temperature range.

9. In a liquid crystal display device as defined in claim 1, wherein said layer of liquid crystal material is magnetically switchable between various optical states, and said at least two chiral additives are so-selected that a switch-on threshold magnetic field and a switch-off threshold magnetic field for said layer are at least approximately linearly dependent upon a temperature within the finite temperature range.

10. A method of operating an operable liquid crystal display device having threshold energy fields dependent on a finite temperature operating range and having a pair of carrier plates spaced from one another to define a space therebetween, means hermetically sealing said plates to one another so as to form a chamber, a layer of a liquid crystal material positioned within said chamber, said liquid crystal material including a nematic carrier host material and at least two chiral doping additives which induce a cholesteric phase in said liquid crystal layer by twisting in such carrier, one of which exhibits a clockwise twisting tendency and the other of which exhibits a counter-clockwise twisting tendency, and means for controllably applying a select energy field to said liquid crystal layer, comprising
applying the select energy field to said liquid crystal layer so as to generate selective display characteristic data by causing such layer to be switched between an induced cholesteric phase and a nematic phase.

11. In a method as defined in claim 10, wherein said liquid crystal layer is located between two linear polarizers, said induced cholesteric phase has a twisting about an axis which is substantially perpendicular to said carrier plates, said twisting having a pitch defined by the relation:

$$p = d/(\tfrac{1}{4} + n/2)$$

wherein p is the pitch, d is the thickness of the liquid crystal layer and n is a natural number, and said nematic phase has a plate-perpendicular preferential direction.

12. A method of operating an operable liquid crystal display device having threshold energy fields dependent on a finite temperature operating range and having a pair of carrier plates spaced from one another to define a space therebetween, means hermetically sealing said plates to one another so as to form a chamber, a layer of a liquid crystal material positioned within said chamber, said liquid crystal material including a nematic carrier host material and at least two chiral additive which induce a cholesteric phase in said liquid crystal layer by twisting in such carrier, one of which exhibits a clockwise twisting tendency and the other of which exhibits a counter-clockwise twisting tendency, and means for controllably applying a select energy field to said liquid crystal layer, comprising applying the select energy field to said liquid crystal layer so as to generate selective display characteristic data by causing such layer to be switched between an induced cholesteric phase and a dynamically scattering phase.

13. A method of operating an operable liquid crystal display device having threshold energy fields dependent on a finite temperature operating range and having a pair of carrier plates spaced from one another to define a space therebetween, means hermetically sealing said plates to one another so as to form a chamber, a layer of a liquid crystal material positioned within said chamber, said liquid crystal material including a nematic carrier host material and at least two chiral doping additives which induce a cholesteric phase in said liquid crystal layer by twisting in such carrier, one of which exhibits a clockwise twisting tendency and the other of which exhibits a counter-clockwise twisting tendency, and means for controllably applying a select energy field to said liquid crystal layer, comprising applying the select energy field to said liquid crystal layer so as to generate selective display characteristic data by causing an induced cholesteric phase to become elastically deformed.

14. A method of operating an operable liquid crystal display device having threshold energy fields dependent on a finite temperature operating range and having a pair of carrier plates spaced from one another to define a space therebetween, means hermetically sealing said plates to one another so as to form a chamber, a layer of a liquid crystal material positioned within said chamber, said liquid crystal material including a nematic carrier host material and at least two chiral doping additives which induce a cholesteric phase in said liquid crystal layer by twisting in such carrier, one of which exhibits a clockwise twisting tendency and the other of which exhibits a counter-clockwise twisting tendency, and means for controllably applying a select energy field to said liquid crystal layer, comprising applying the select energy field to said liquid crystal layer so as to generate selective display characteristic data and cause an induced cholesteric phase to switch to another phase, said other phase being retained at least upon a select decrease of the applied switching energy.

* * * * *